United States Patent

Rapp et al.

Patent Number: 6,032,980
Date of Patent: Mar. 7, 2000

[54] CORNER ASSEMBLY FOR A PROTECTIVE ROLLOVER STRUCTURE FOR A WORK MACHINE

[75] Inventors: Joseph A. Rapp, Decatur; Robert L. McNabb, Monticello; William G. Worby, Dwight, all of Ill.

[73] Assignee: Caterpillar Inc., Peoria, Ill.

[21] Appl. No.: 09/160,832

[22] Filed: Sep. 25, 1998

[51] Int. Cl.[7] ................................................. B60R 21/13
[52] U.S. Cl. .............................................. 280/756; 52/657
[58] Field of Search ........................ 280/756; 52/652 C, 52/656.9; 403/270, 271, 272

[56] References Cited

U.S. PATENT DOCUMENTS

| | | |
|---|---|---|
| 420,724 | 2/1890 | Hussey . |
| 3,549,170 | 12/1970 | Shankwitz ............................. 280/150 |
| 3,632,134 | 1/1972 | Babbitt, Jr. ........................... 280/150 C |
| 3,754,315 | 8/1973 | Heitman .................................. 29/400 |
| 3,787,085 | 1/1974 | Bucher et al. ......................... 296/28 C |
| 3,791,668 | 2/1974 | Adams ................................. 280/150 C |
| 4,136,985 | 1/1979 | Taul ....................................... 403/172 |
| 4,158,460 | 6/1979 | White ..................................... 280/756 |
| 4,159,835 | 7/1979 | Leja et al. .............................. 280/756 |
| 5,280,955 | 1/1994 | Nelson et al. .......................... 280/756 |
| 5,529,342 | 6/1996 | Mast et al. .............................. 280/756 |
| 5,586,784 | 12/1996 | Mast et al. .............................. 280/756 |
| 5,630,622 | 5/1997 | Kirschenmann et al. .............. 280/756 |
| 5,636,867 | 6/1997 | McNabb et al. ........................ 280/756 |

*Primary Examiner*—Eric Culbreth
*Attorney, Agent, or Firm*—Maginot, Addison & Moore

[57] ABSTRACT

A corner assembly for a protective rollover structure of a work machine is disclosed. The corner assembly includes a first tube having a first inner wall, a first outer wall, a first right lateral wall, and a first left lateral wall which collective define a first interior space. The first inner wall of the first tube has a first gusset slot defined therein. The corner assembly also has a second tube having a second inner wall, a second outer wall, a second right lateral wall, and a second left lateral wall which collective define a second interior space. The second inner wall of the second tube has a second gusset slot defined therein. The corner assembly further includes a gusset having a first inner leg, a first outer leg, a second inner leg, and a second outer leg. The gusset is positioned relative to the first tube and the second tube such that (i) the gusset extends through both the first gusset slot and the second gusset slot so as to be located within both the first interior space and the second interior space, (ii) the first inner leg of the gusset contacts the first inner wall of the first tube, (iii) the first outer leg of the gusset contacts the first outer wall of the first tube, (iv) the second inner leg of the gusset contacts the second inner wall of the second tube, and (v) the second outer leg of the gusset contacts the second outer wall of the second tube.

17 Claims, 5 Drawing Sheets

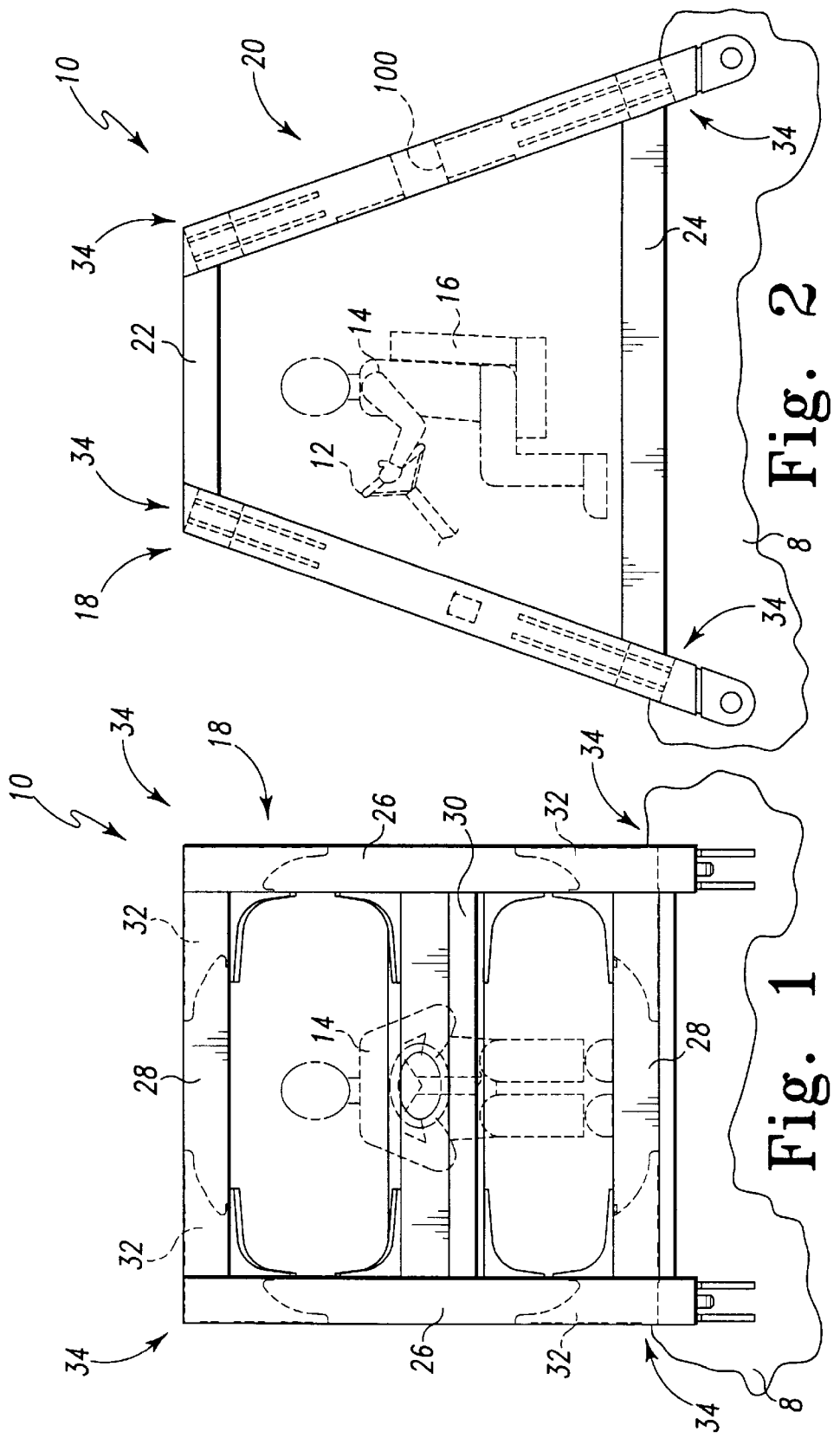

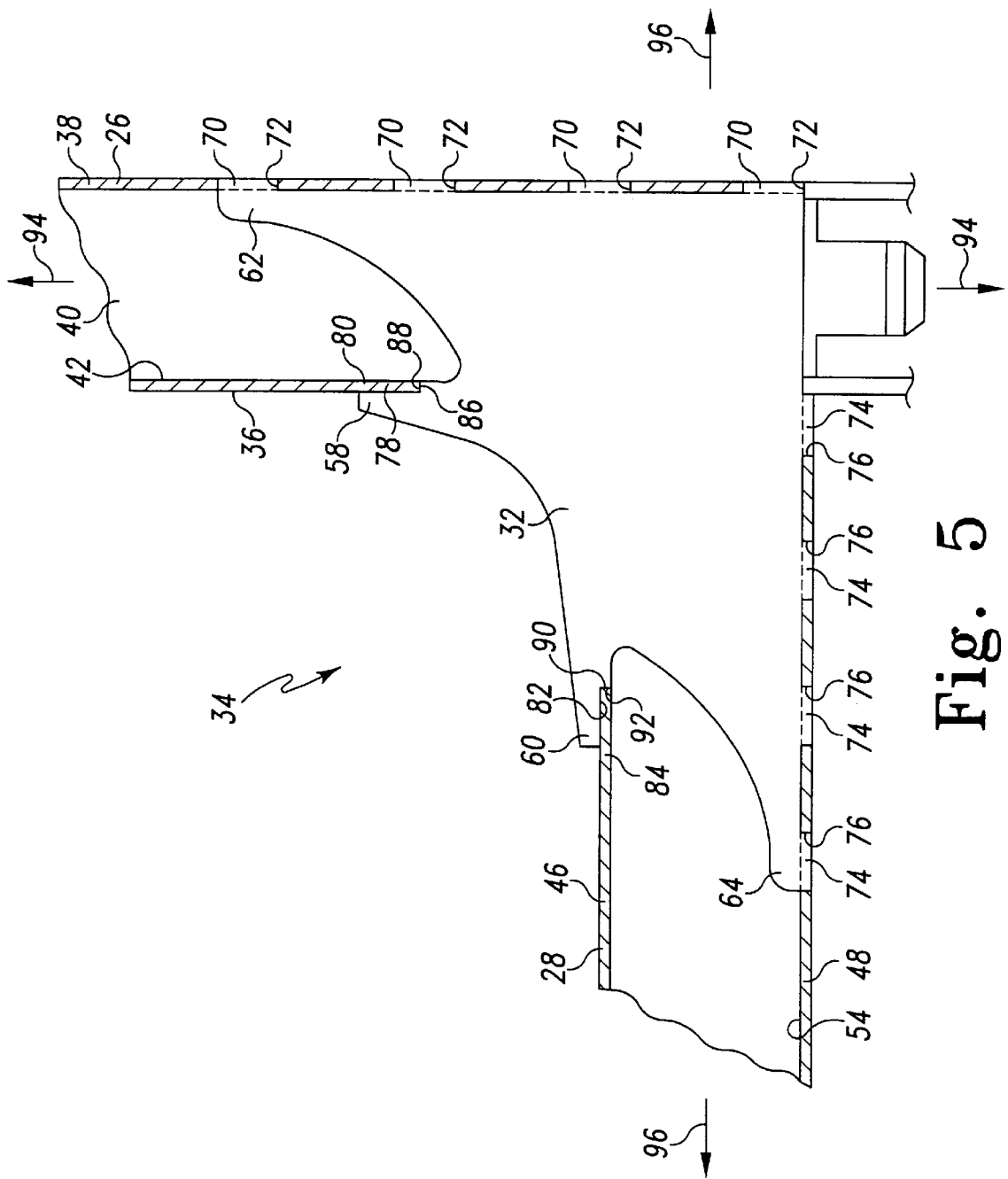

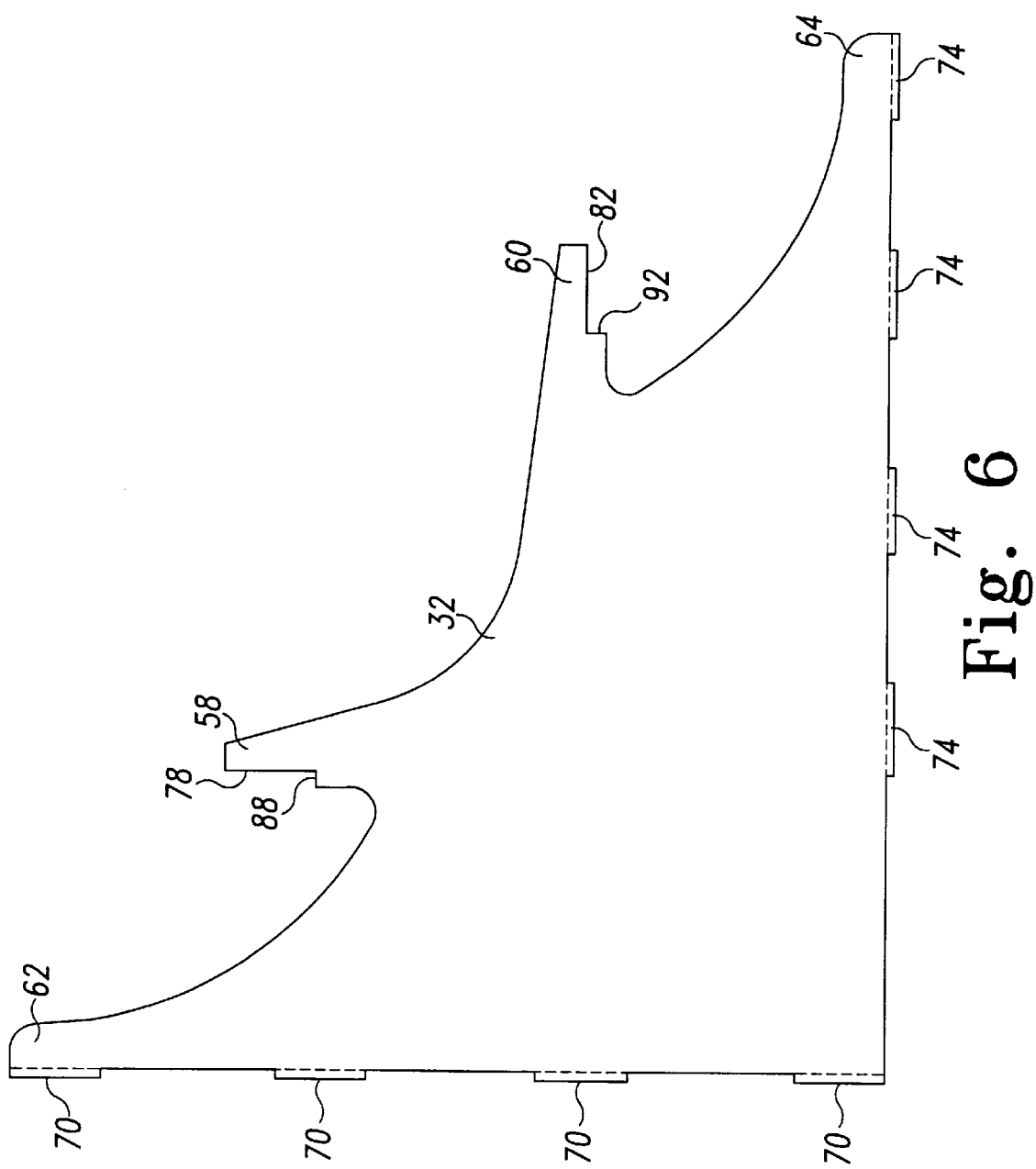

CORNER ASSEMBLY FOR A PROTECTIVE ROLLOVER STRUCTURE FOR A WORK MACHINE

TECHNICAL FIELD OF THE INVENTION

The present invention relates generally to a protective rollover structure, and more particularly to a corner assembly for a protective rollover structure of a work machine.

BACKGROUND OF THE INVENTION

Work machines, such as mining trucks, typically include a cab which houses an operator and the various controls for the work machine. One function of the cab is to protect the operator and the controls from the environment. For example, the cab provides protection from rain, heat, dust, and noise. In addition, the frame of the cab functions as a protective rollover structure that protects the operator in the unlikely event the work machine rolls over while performing a work function.

In order to effectively provide rollover protection the frame of the cab must be strong enough to support the weight of the work machine without buckling or collapsing. Therefore, since some work machines are extremely heavy the cab frame tends to be rather large and bulky in order to support the weight of the work machine in the event of a rollover. While having a rather large and bulky cab frame does provide adequate protection in a rollover situation, it also tends to obstruct the view of the operator which can also be a problem.

In an attempt to address the above described visibility problem, various cab frame designs utilize smaller structural components, i.e. steel tubes, reinforced with steel gussets. However, the design of some of the aforementioned gussets do not adequately strengthen or reinforce the structural components of the cab frame.

What is needed therefore is a protective rollover structure for a cab of a work machine which overcomes the above-mentioned drawback.

DISCLOSURE OF THE INVENTION

In accordance with a first embodiment of the present invention, there is provided a corner assembly for a protective rollover structure of a work machine. The corner assembly includes a first tube having a first inner wall, a first outer wall, a first right lateral wall, and a first left lateral wall which collective define a first interior space. The first inner wall of the first tube has a first gusset slot defined therein. The corner assembly also has a second tube having a second inner wall, a second outer wall, a second right lateral wall, and a second left lateral wall which collective define a second interior space. The second inner wall of the second tube has a second gusset slot defined therein. The corner assembly further includes a gusset having a first inner leg, a first outer leg, a second inner leg, and a second outer leg. The gusset is positioned relative to the first tube and the second tube such that (i) the gusset extends through both the first gusset slot and the second gusset slot so as to be located within both the first interior space and the second interior space, (ii) the first inner leg of the gusset contacts the first inner wall of the first tube, (iii) the first outer leg of the gusset contacts the first outer wall of the first tube, (iv) the second inner leg of the gusset contacts the second inner wall of the second tube, and (v) the second outer leg of the gusset contacts the second outer wall of the second tube.

In accordance with a second embodiment of the present invention, there is provided a corner assembly for a protective rollover structure of a work machine. The corner assembly includes a tube having an inner wall, an outer wall, a right lateral wall, and a left lateral wall which collective define an interior space. The inner wall of the tube has a gusset slot defined therein. The corner assembly also has a gusset having an inner leg and an outer leg. The gusset is positioned relative to the tube such that (i) the gusset extends through the gusset slot so as to be located within the interior space, (ii) the inner leg of the gusset contacts the inner wall of the tube, and (iii) the outer leg of the gusset contacts the outer wall of the tube.

In accordance with a third embodiment of the present invention, there is provided a corner assembly for a protective rollover structure of a work machine. The corner assembly includes a tube having an inner wall, an outer wall, a right lateral wall, and a left lateral wall which collective define an interior space. The inner wall of the tube has a gusset slot defined therein. The corner assembly also includes a gusset having an inner leg and an outer leg. The gusset is positioned relative to the tube such that (i) the gusset extends through the gusset slot so as to be located within the interior space, (ii) the inner leg of the gusset contacts the inner wall of the tube, and (iii) the outer leg of the gusset contacts the outer wall of the tube, wherein (i) the outer leg has a plurality of feet extending therefrom, (ii) the outer wall of the tube has a plurality of foot slots defined therein, (iii) the plurality of feet are respectively located within the plurality of foot slots, (iv) the inner leg has a notch defined therein, and (v) a portion of the inner wall is located within the notch.

BRIEF DESCRIPTION OF THE DRAWINGS

FIG. 1 is a front elevational view of a protective rollover structure which incorporates the features of the present invention therein (note that a portion of a work machine is also shown for clarity of description);

FIG. 2 is a side elevation view of the rollover protection structure of FIG. 1;

FIG. 5 is a fragmentary cross sectional view of an assembled corner assembly of the forward subassembly of FIG. 3; and FIG. 6 is a side elevational view of a gusset of the corner assembly of FIG. 5.

BEST MODE FOR CARRYING OUT THE INVENTION

Figure 3:
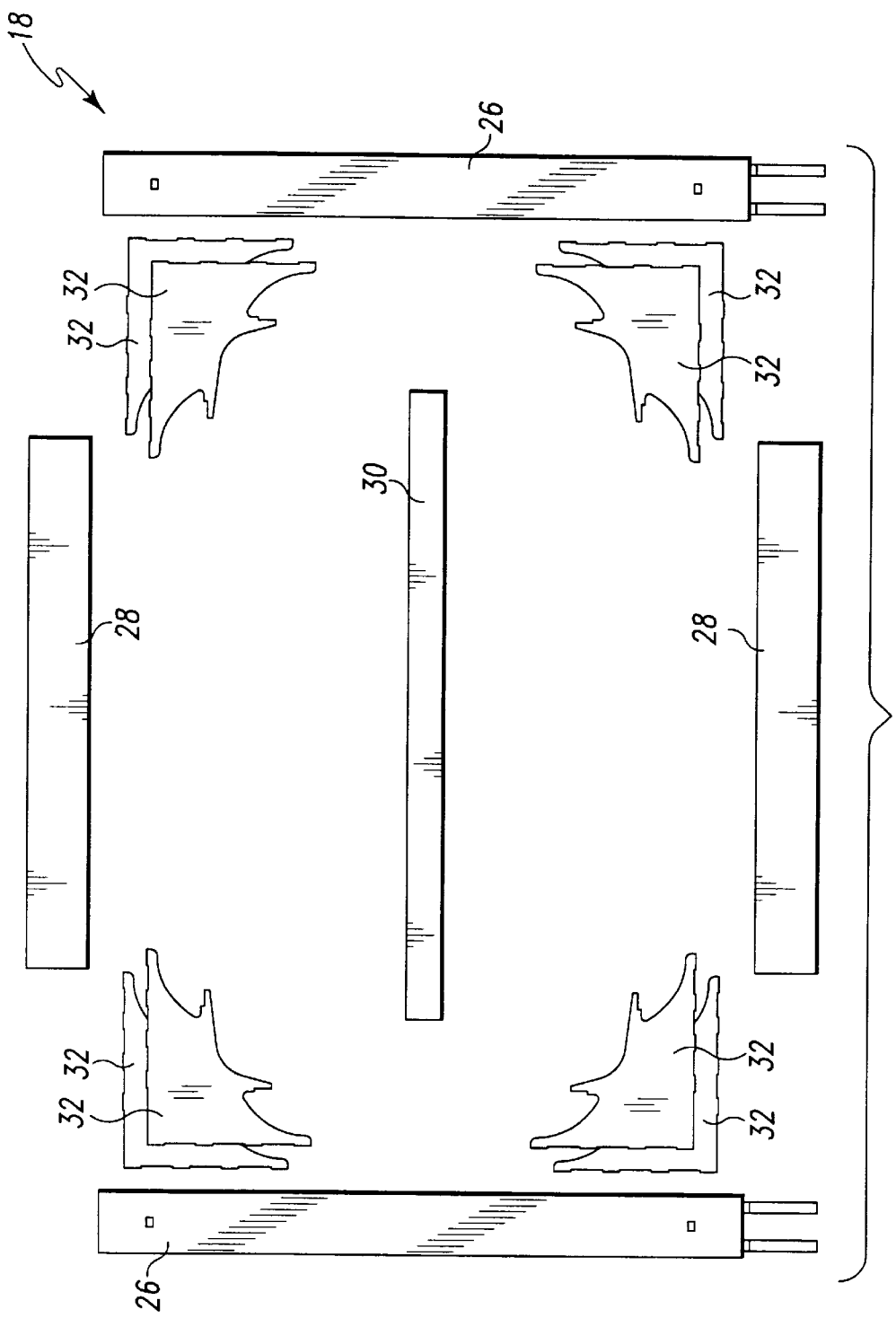
FIG. 3 is an exploded view of a forward subassembly of the protective rollover structure of FIG. 1.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIGS. 1 and 2, there is shown a portion of a work machine 8 (such as a mining truck) having a protective rollover structure 10 attached thereto which incorporates the features of the present invention. Protective rollover structure 10 is utilized as a frame for a cab (not shown) of work machine 8. The cab functions to house an operator 14, a seat 16, and controls, such as a steering wheel 12, of work machine 8. Protective rollover structure 10 includes a forward subassembly 18, a rear subassembly 20, a pair of upper cross tubes 22, and a pair of lower cross tubes 24.

Referring now to FIG. 3, forward subassembly 18 includes a pair of vertical tubes 26, a pair of horizontal tubes 28, a brace 30, and a number of gussets 32.

Figure 4:
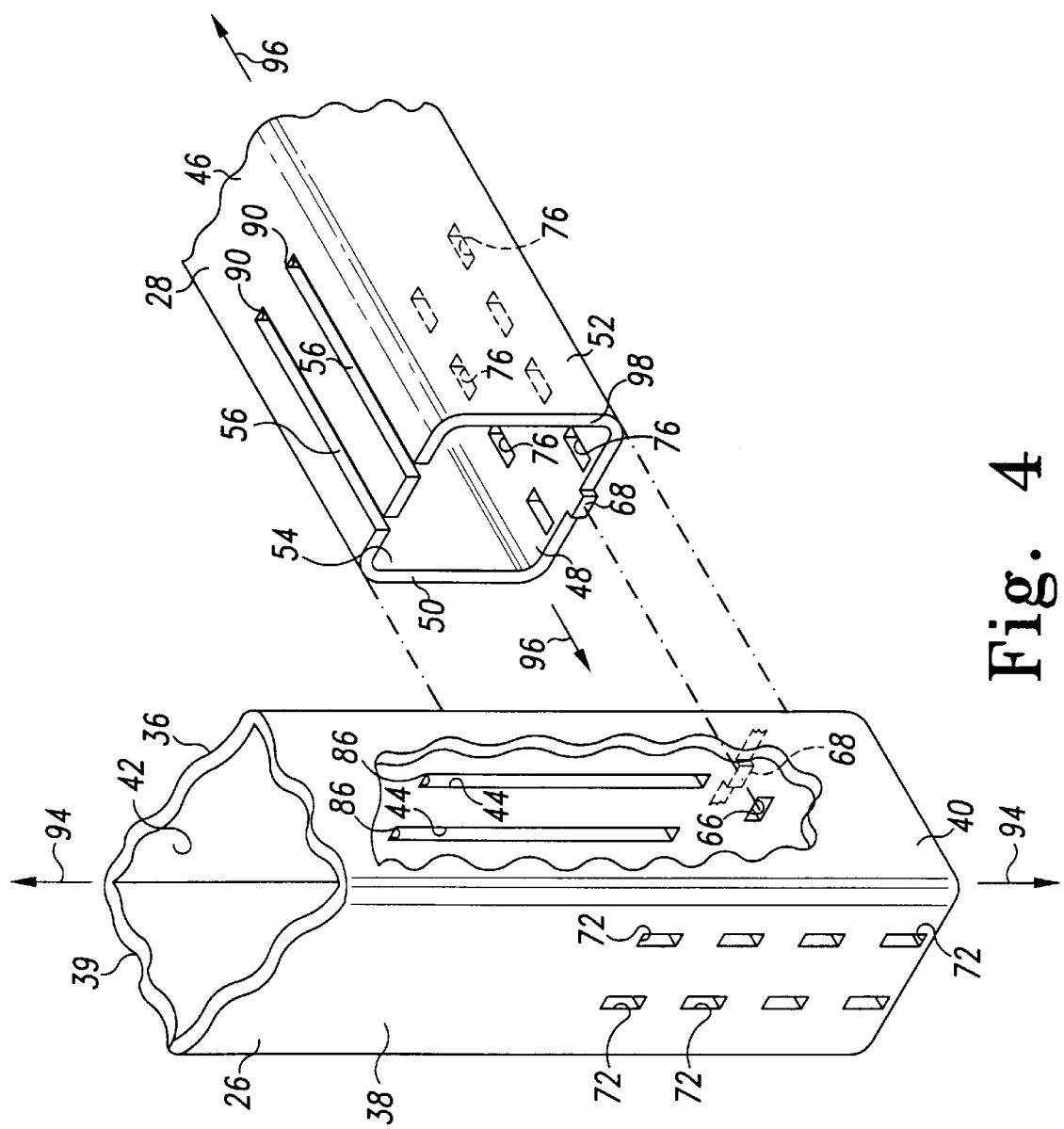
FIG. 4 is a fragmentary perspective view of a vertical tube and a horizontal tube of the forward subassembly of FIG. 3.

As shown in FIGS. 4 and 5, each vertical tube 26 has an inner wall 36, an outer wall 38, a right lateral wall 39, and a left lateral wall 40 which collective define an interior space 42. Interior space 42 extends in a longitudinal direction as indicated by arrow 94. Inner wall 36 of vertical tube 26 has an alignment slot 66 defined therein (see FIG. 4). Outer wall 38 of vertical tube 26 has a number of foot slots 72 defined therein. In addition, inner wall 36 of each vertical tube 26 has a pair of gusset slots 44 defined therein. Each gusset slot 44 also extends in the longitudinal direction as indicated by arrow 94. Each gusset slot 44 is spaced inwardly from both right lateral wall 39 and left lateral wall 40. Inner wall 36 also defines a pair of upper slot surfaces 86 (see FIG. 4). It should be understood that while only one end of vertical tube 26 is shown in FIG. 4, both ends of each vertical tube 26 have an identical structure. For example, the end of vertical tube 26 opposite to the one shown in FIG. 4 also has an alignment slot 66 defined in inner wall 36, inner wall 36 also defines a pair of upper slot surfaces 86, outer wall 38 has a number of foot slots 72 defined therein, and inner wall 36 has a pair of gusset slots 44 defined therein.

Each horizontal tube 28 has an inner wall 46, an outer wall 48, a right lateral wall 50, and a left lateral wall 52 which collectively define an interior space 54. Interior space 54 extends in a longitudinal direction as indicated by arrow 96. Outer wall 48 of horizontal tube 28 has an alignment tab 68 extending therefrom (see FIG. 4). Outer wall 48 of each horizontal tube 28 has a number of foot slots 76 defined therein. In addition, inner wall 46 of each horizontal tube 28 has a pair of gusset slots 56 defined therein. Each gusset slot 56 also extends in the longitudinal direction as indicated by arrow 96. Each gusset slot 56 is spaced inwardly from both right lateral wall 50 and left lateral wall 52. Inner wall 46 also defines a pair of upper slot surfaces 90 (see FIG. 4). It should be understood that while only one end of horizontal tube 28 is shown in FIG. 4, both ends of each horizontal tubes 28 have an identical structure. For example, the end of horizontal tube 28 opposite to the one shown in FIG. 4 also has an alignment tab 68 extending therefrom, outer wall 48 has a number of foot slots 76 defined therein, inner wall 46 has a pair of gusset slots 56 defined therein, and inner wall 46 also defines a pair of upper slot surfaces 90.

Referring now to FIG. 6, each gusset 32 has an inner leg 58, an outer leg 62, an inner leg 60, and an outer leg 64. Outer leg 62 has a number of feet 70 extending therefrom. Outer leg 64 also has a number of feet 74 extending therefrom. Inner leg 58 has a notch 78 defined therein. Inner leg 60 has a notch 82 defined therein. In addition, inner legs 58 and 60 each respectively define a notch surface 88 and a notch surface 92.

INDUSTRIAL APPLICABILITY

During assembly of protective rollover structure 10 each vertical tube 26 is positioned relative to each horizontal tube 28 as shown in FIG. 4. Horizontal tubes 28 are advanced toward vertical tubes 26 such that each alignment tab 68 of each horizontal tube 28 is positioned within alignment slots 66 of each vertical tube 26. Positioning vertical tube 26 and horizontal tube 28 in the above described manner aligns each gusset slot 44 defined in vertical tube 26 with a gusset slot 56 defined in horizontal tube 28.

As shown in FIG. 5, during the above described assembly process one gusset 32 is positioned relative to each vertical tube 26 and each horizontal tube 28 such that (i) gusset 32 extends through one gusset slot 44 and one gusset slot 56 so as to be located within interior space 42 and interior space 54, (ii) inner leg 58 of gusset 32 contacts inner wall 36 of vertical tube 26, (iii) outer leg 62 of gusset 32 contacts outer wall 38 of vertical tube 26, (iv) inner leg 60 of gusset 32 contacts inner wall 46 of horizontal tube 28, and (v) outer leg 64 of gusset 32 contacts outer wall 48 of horizontal tube 28. In addition, it should be appreciated that positioning gusset 32 in the above described manner locates (i) feet 70 within foot slots 72, (ii) feet 74 within foot slots 76, (iii) a portion 80 of inner wall 36 within notch 78, and (iv) a portion 84 of inner wall 46 within notch 82. Furthermore, positioning gusset 32 (i) in gusset slot 44 locates upper slot surface 86 in contact with notch surface 88 and (ii) in gusset slot 56 locates upper slot surface 90 in contact with notch surface 92.

Once gusset 32, vertical tube 26, and horizontal tube 28 are located in the above described manner (see FIG. 5) feet 70 are welded to outer wall 38 of vertical tube 26 via foot slots 72. Welding feet 70 to outer wall 38 secures outer leg 62 to outer wall 38. In a similar manner, feet 74 are welded to outer wall 48 of horizontal tube 28 via foot slots 76. Welding feet 74 to outer wall 48 secures outer leg 64 to outer wall 48. In addition, inner leg 58 and inner leg 60 are respectively welded to inner wall 36 of vertical tube 26 and inner wall 46 of horizontal tube 28. Edge 98 (see FIG. 4) of horizontal tube 28 is welded to inner wall 36 of vertical tube 26. Positioning and welding vertical tube 26, horizontal tube 28, and gusset 32 in the above described manner completes the construction of corner assembly 34.

It should be appreciated that additional gussets 32 are positioned relative to, and welded to, vertical tubes 26 and horizontal tubes 28 in the above described manner until one gusset is positioned within each aligned gusset slot 56 and 44. Therefore, each of the four corner assemblies 34 (see FIG. 1) of forward subassembly 18 includes two gussets 32 positioned as described above. Thus, forward subassembly 18 includes a total of eight gussets 32.

Brace 30 is interposed between horizontal tubes 28, and each end thereof is inserted through a hole (not shown) defined in each vertical tube 26. Brace 30 is then welded to each vertical tube 26.

The arrangement and attachment of horizontal tubes 28, vertical tubes 26, gussets 32, and brace 30 completes the construction of forward subassembly 18 as shown in FIG. 1. Rear subassembly 20 is constructed in an identical manner with the exception that the brace 100 (see FIG. 2) utilized in rear subassembly 20 has a larger circumference.

Forward subassembly 18 and rear subassembly 20 are attached via a pair of upper cross tubes 22 and a pair of lower cross tubes 24 as shown in FIG. 2 (note that only one upper cross tube 22 and one lower cross tube 24 is shown in FIG. 2 for clarity of description). Specifically, upper cross tubes 22 are spaced apart from each other such that an end of each upper cross tube 22 is positioned adjacent to a corner assembly 34 of forward subassembly 18 and rear subassembly 20. The ends of each upper cross tube 22 are then welded to forward subassembly 18 and rear subassembly 20. Lower cross tubes 24 are positioned and attached to forward subassembly 18 and rear subassembly 20 in a similar manner as described for upper cross tubes 22 to complete the construction of protective roll over structure 10.

Being able to secure (i) outer leg 62 to outer wall 38 and (ii) outer leg 64 to outer wall 48 in the above described manner stiffens outer wall 38 and outer wall 48. Stiffening outer wall 38 and outer wall 48 significantly strengthens forward subassembly 18 (and thus protective rollover structure 10) as compared to other corner assembly designs which utilize gussets that are only secured to the inner walls (e.g. inner wall 36 and inner wall 46) of the vertical and horizontal tubes. Moreover, since rear subassembly 20 is constructed in an identical manner as forward assembly 18 (i.e. corner assemblies 34 are utilized in rear subassembly as well), rear subassembly 20 is also significantly strengthened in the same manner. Therefore, smaller structural components (i.e. horizontal tubes 28 and vertical tubes 26) can be utilized to construct protective rollover structure 10 while still maintaining the structural strength thereof. As a result, protective rollover structure 10 possesses the appropriate strength to protect operator 14 while allowing operator 14 to have good visibility while positioned within the cab (not shown).

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A corner assembly for a protective rollover structure of a work machine, comprising:

a first tube having a first inner wall, a first outer wall, a first right lateral wall and a first left lateral wall which collectively define a first interior space, said first inner wall of said first tube having a first gusset slot defined therein;

a second tube having a second inner wall, a second outer wall, a second right lateral wall and a second left lateral wall which collective define a second interior space, said second inner wall of said second tube having a second gusset slot defined therein; and a gusset having a first inner leg, a first outer leg, a second inner leg, and a second outer leg, wherein said gusset is positioned relative to said first tube and said second tube such that (i) said gusset extends through both said first gusset slot and said second gusset slot so as to be located within both said first interior space and said second interior space, (ii) said first inner leg of said gusset contacts said first inner wall of said first tube, (iii) said first outer leg of said gusset contacts said first outer wall of said first tube, (iv) said second inner leg of said gusset contacts said second inner wall of said second tube, and (v) said second outer leg of said gusset contacts said second outer wall of said second tube.

2. The assembly of claim 1, wherein:

said first inner wall of said first tube has an alignment slot defined therein, said second outer wall of said second tube has an alignment tab extending therefrom, and said alignment tab is positioned within said alignment slot.

3. The assembly of claim 1, wherein:

said first outer leg has a first foot extending therefrom, said first outer wall of said first tube has a first foot slot defined therein, said first foot is located within said first foot slot, said second outer leg has a second foot extending therefrom, said second outer wall of said second tube has a second foot slot defined therein, and said second foot is located within said second foot slot.

4. The assembly of claim 1, wherein:

said first inner leg has a first notch defined therein, a first portion of said first inner wall is located within said first notch, said second inner leg has a second notch defined therein, and a second portion of said second inner wall is located within said second notch.

5. The assembly of claim 4, wherein:

said first inner wall of said first tube defines a first upper slot surface, said first inner leg of said gusset defines a first notch surface, and said first upper slot surface contacts said first notch surface when said gusset is positioned within said first gusset slot, said second inner wall of second tube defines a second upper slot surface, said second inner leg of said gusset defines a second notch surface, and said second upper slot surface contacts said second notch surface when said gusset is positioned within said second gusset slot.

6. The assembly of claim 1, wherein:

said first interior space extends in a first longitudinal direction, said first gusset slot also extends in said first longitudinal direction, said second interior, space extends in a second longitudinal direction, and said second gusset slot also extends in said second longitudinal direction.

7. The assembly of claim 1, wherein:

said first gusset slot is spaced inwardly from both said first right lateral wall and said first left lateral wall, and said second gusset slot is spaced inwardly from both said second right lateral wall and said second left lateral wall.

8. A corner assembly for a protective rollover structure of a work machine, comprising:

a tube having an inner wall, an outer wall, a right lateral wall and a left lateral wall which collectively define an interior space, said inner wall of said tube having a gusset slot defined therein; and a gusset having an inner leg and an outer leg, said gusset being positioned relative to said tube such that (i) said gusset extends through said gusset slot so as to be located within said interior space, (ii) said inner leg of said gusset contacts said inner wall of said tube, and (iii) said outer leg of said gusset contacts said outer wall of said tube.

9. The assembly of claim 8, wherein:

said outer leg has a foot extending therefrom, said outer wall of said tube has a foot slot defined therein, and said foot is located within said foot slot.

10. The assembly of claim 8, wherein:

said inner leg has a notch defined therein, and a portion of said inner wall is located within said notch.

11. The assembly of claim 10, wherein:

said inner wall of tube defines an upper slot surface, said inner leg of said gusset defines a notch surface, and said upper slot surface contacts said notch surface when said gusset is positioned within said gusset slot.

12. The assembly of claim 8, wherein:

said internal space extending in a longitudinal direction, and said gusset slot also extends in said longitudinal direction.

13. The assembly of claim 8, wherein:

said gusset slot is spaced inwardly from both said right lateral wall and said left lateral wall.

14. A corner assembly for a protective rollover structure of a work machine, comprising:

a tube having an inner wall, an outer wall, a right lateral wall and a left lateral wall which collectively define an interior space, said inner wall of said tube having a gusset slot defined therein; and a gusset having an inner leg and an outer leg, said gusset being positioned relative to said tube such that (i) said gusset extends through said gusset slot so as to be located within said interior space, (ii) said inner leg of said gusset contacts said inner wall of said tube, and (iii) said outer leg of said gusset contacts said outer wall of said tube, wherein (i) said outer leg has a plurality of feet extending therefrom, (ii) said outer wall of said tube has a plurality of foot slots defined therein, (iii) said plurality of feet are respectively located within said plurality of foot slots, (iv) said inner leg has a notch defined therein, and (v) a portion of said inner wall is located within said notch.

15. The assembly of claim 14, wherein:

said inner wall of tube defines an upper slot surface, said inner leg of said gusset defines a notch surface, and said upper slot surface contacts said notch surface when said gusset is positioned within said gusset slot.

16. The assembly of claim 14, wherein:

said interior space extending in a longitudinal direction, and said gusset slot also extends in said longitudinal direction.

17. The assembly of claim 14, wherein:

said gusset slot is spaced inwardly from both said right lateral wall and said left lateral wall.

* * * * *